(12) United States Patent
Loving et al.

(10) Patent No.: US 7,720,873 B2
(45) Date of Patent: May 18, 2010

(54) DYNAMIC DATA DISCOVERY OF A SOURCE DATA SCHEMA AND MAPPING TO A TARGET DATA SCHEMA

(75) Inventors: Linwood E. Loving, Mechanicsville, VA (US); Donald E. Schaefer, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 11/766,375

(22) Filed: Jun. 21, 2007

(65) Prior Publication Data
US 2008/0320012 A1    Dec. 25, 2008

(51) Int. Cl.
G06F 7/00        (2006.01)
G06F 17/30      (2006.01)

(52) U.S. Cl. .................... 707/802; 707/803; 707/804; 707/807

(58) Field of Classification Search ................. 707/100
See application file for complete search history.

(56) References Cited

U.S. PATENT DOCUMENTS

| | | | |
|---|---|---|---|
| 6,151,608 A | 11/2000 | Abrams | |
| 6,389,429 B1 * | 5/2002 | Kane et al. | 707/200 |
| 6,785,689 B1 * | 8/2004 | Daniel et al. | 707/102 |
| 6,820,135 B1 * | 11/2004 | Dingman et al. | 709/246 |
| 6,874,141 B1 * | 3/2005 | Swamy et al. | 717/144 |
| 6,996,589 B1 * | 2/2006 | Jayaram et al. | 707/204 |
| 7,152,074 B2 * | 12/2006 | Dettinger et al. | 707/102 |
| 7,290,003 B1 * | 10/2007 | Tong | 707/101 |
| 2002/0194196 A1 | 12/2002 | Weinberg et al. | |
| 2003/0172368 A1 * | 9/2003 | Alumbaugh et al. | 717/106 |
| 2003/0195888 A1 | 10/2003 | Croft et al. | |
| 2003/0217069 A1 * | 11/2003 | Fagin et al. | 707/102 |
| 2004/0015783 A1 * | 1/2004 | Lennon et al. | 715/523 |
| 2004/0107201 A1 | 6/2004 | Morris | |
| 2005/0050068 A1 | 3/2005 | Vaschillo et al. | |
| 2005/0065952 A1 * | 3/2005 | Dettinger et al. | 707/101 |
| 2005/0149537 A1 * | 7/2005 | Balin et al. | 707/100 |
| 2005/0171968 A1 * | 8/2005 | Yuknewicz et al. | 707/102 |

(Continued)

OTHER PUBLICATIONS

Introduction to Relational Databases—Part 1: Theoretical Foundation by Tore Bostrup, at http://www.15seconds.com/Issue/020522.htm?voteresult=5.

*Primary Examiner*—Kuen S Lu
*Assistant Examiner*—Tuan Pham
(74) *Attorney, Agent, or Firm*—Ojanen Law Offices Ltd.; Karuna Ojanen (57) ABSTRACT

A computerized method, program product, and a service that discovers trace data inserted into a source database having an unknown schema. Once the trace data is found by a dynamic data discovery engine, the tables, the fields, and the attributes of the fields in the source schema in which the trace data were located can be evaluated to determine if the data in the fields are pertinent to a target database. If so, then the data in those fields can be mapped and transferred to a target database. The dynamic data discovery engine generates the commands in both the source and the target database command language to find all pertinent data, map and transfer the data from the source database to a target database. The dynamic data discovery engine generates commands to create the target database and/or fields within an existing target database for the mapped and transferred data.

18 Claims, 4 Drawing Sheets

U.S. PATENT DOCUMENTS

2006/0101073 A1* 5/2006 Popa et al. ............... 707/104.1
2007/0203923 A1* 8/2007 Thomas ...................... 707/100
2008/0243772 A1* 10/2008 Fuxman et al. ................ 707/2

* cited by examiner

DYNAMIC DATA DISCOVERY OF A SOURCE DATA SCHEMA AND MAPPING TO A TARGET DATA SCHEMA

FIELD

This invention relates to the discovery and transfer of data from an unknown source schema to a target schema and more particularly relates to a method and a service that automatically discovers fields in a source database and then maps those fields to a target database.

BACKGROUND

An important feature of the modern world is information: obtaining it; organizing it; storing it; accessing it, etc. Indeed, much of the world's computing power is dedicated to maintaining and efficiently using information, typically stored in databases. A database is a logical collection of data, in the form of text, numbers, or encoded graphics, organized for storage as a unit, typically in a computer. Databases are commonly organized into tables that are simple, row and column arrangements of related data that characterize persons, products companies, electronic mail, contact information, financial data, records of sales, performance data of processing units—anything about which data is collected. In a typical database, the rows of a table represent records, or collections of information about separate items. Each horizontal record contains one or more fields, representing individual data elements. Each vertical column of the table represents one field that is stored for each row in the table. The database records may contain any type of data and that data can be searched, accessed and modified by the user. Businesses and other organizations use databases to manage information about clients, orders, client accounts, etc. Businesses often need to manage and merge the data from many different sources, among which are "legacy" sources that use obsolete software or data structures.

Realizing the importance of meaningful storage of data, in 1970 Dr. E. F. Codd, developed the relational model of databases based on how users perceive data and a mathematical theory of relations. The relational model represents data as two-dimensional logical entities in which each logical entity represents some real-world person, place, thing, or event about which information is collected. A relational database is a set of tables derived from logical entities and manipulated in accordance with the relational model of data. The relational database uses objects to store, manage, and access data; the basic objects in the database are tables, columns, views, indexes, constraints (relationships), and triggers. Articles by Dr. E. F. Codd throughout the 1970s and 80s such as TWELVE RULES FOR RELATIONAL DATABASES and IS YOUR DBMS REALLY RELATIONAL? published in COMPUTERWORLD on Oct. 14, 1985 and DOES YOUR DBMS RUN BY THE RULES? published in COMPUTERWORLD on Oct. 11, 1985 are still referenced for implementation of relational databases. The twelve rules now number 333 rules and are published in *The Relational Model for Database Management, Version* 1 (Addison-Wesley, 1990).

A relational database stores information in tables as rows and columns of related data, and allows searches by using data in specified columns of one table to find additional data in another table. In searches, a relational database matches information from a field in one table with information in a corresponding field of another table and combines them to generate a third table that contains the requested data from the two tables. As an example of a relational database, if one database table contains the fields name, serial, address, phone and another table contains the fields serial, salary, and bonus, a relational database can match the serial fields in the two database tables to find such information as the names, and bonus of all people whose salary is above or below a certain amount. Thus, a relational database matches values in two tables to relate information in one table to information in the other table. Computer databases are typically relational databases.

If all the world's data were kept in relational databases, the world would be much simpler. Today, however, many of the small and large businesses that grew with the use of computers would simply hire programmers who would create new databases or data schemas from scratch, without considering the principles of relational databases. Before the advent of information technology as a discipline and a college major, these programmers would simply add fields that would serve a new purpose rather than redesign the whole business data from the ground up. So, in the world today, databases systems are collections of files stored on computers that may or may not be linked to other collections or data in the same system or other linked systems such as the Internet. Indeed, the World Wide Web (www) is essentially a large database comprised of an expansive network of interconnected computers upon which businesses, governments, groups, and individuals throughout the world maintain inter-linked computer files known as web pages. The volume of data available on the Internet is increasing daily, but the ability of users to understand and transform data on the Web, let alone their own data, has not kept pace. People need the ability to capture, use, manipulate and integrate data available on the Internet from multiple sources for such applications as data mining, data warehousing, global information systems, and electronic commerce. To transform data from one structure or schema to another, mappings must be created between the data source or a set of heterogeneous data sources and a target or integrated schema.

So in today's world, there is a critical need to be able to transform data efficiently in large amounts without requiring people to retype or reenter the data manually. To accomplish efficient data transformation, data from each field of the database containing information to be transformed is directed to the appropriate field of the receiving database. Great care is required in the transformation of data from one database to another as the data is easily misdirected to the wrong place in the receiving database, causing errors and confusion. In addition to placing the wrong values in fields, a poorly constructed transformation scheme can overwrite the existing good data in the receiving database.

To achieve the most accuracy, data transforms are often performed one record at a time. First, each field in the source table, from which data will be transformed, is mapped to a corresponding field in a destination table, which will receive the data, and then each record is transformed. In order to do this properly, the destination data will have the same overall table and field structure as the source data. In particular, the source fields that are to be transformed are typically from the same table and all the data values represented by the source data are typically stored in individual fields rather than embedded within one or more text fields. Further, there is a direct, one-to-one correspondence between individual source fields and individual destination fields; ideally, the corresponding fields would have the same names. In addition, the data types of the source and destination fields are compatible. For mappings to destination fields with value domains, which are enumerated sets of valid values for a destination text field, there is a direct, one-to-one correspondence between the values within the mapped source and destination field values, and the corresponding values are the same.

If the conditions discussed above exist, data transformation can proceed automatically without user intervention. The field mappings and the value mappings can both be completed automatically and easily. Unfortunately, these conditions rarely exist, leading to some or all of the following database transformation problems. The source fields to be mapped may not all belong to a single source table, so that the mapping tool must provide a mechanism to first join the tables together. Then, the mapping tool must provide a mechanism to lookup fields from each source table corresponding to fields in the primary source table in order to create virtual extended records for transform. One or more source data values may be embedded within longer descriptive text fields and these embedded values cannot be conveniently mapped to destination fields and data values without first being parsed, or separated, from the source field. Corresponding source and destination fields may not have the same name, requiring manual field mapping before proceeding with data transformation. For mappings to destination fields with value domains, the corresponding source and destination field values may not be the same, and destination values may not exist. During a record-at-a-time transformation, a mapping tool identifies and flags each discrepancy for exception handling, and the user must either manually identify the corresponding destination value or indicate that a new destination value should be created to correspond to the source value. Even when value mapping is not necessary, source data values might require manual adjustment or correction. Also, it may not be possible to map values directly because the appropriate mapping might be between combinations of two or more source values and combinations of two or more destination values, rather than between individual source and destination values. For mappings to destination fields without value domains, where value domains are an enumerated set of valid values for a destination text field, the data types of the corresponding source and destination fields may be different, requiring data conversion to the proper data type. For mapping to destination fields that represent physical measurements, the units of measure in the source data may be: (a) missing entirely, such as when all the values in a source field have the same implicit unit; (b) inconsistent, such as when different text strings are used to represent the same physical unit (e.g., inches, inch, in, or "); or (c) different for each source value. In each case, the unit of measure strings must be normalized and appended to each numeric source value as part of the import process. The hierarchy of the source data might have been flattened into multiple fields in the source table. This flattening can occur when a category hierarchy is stored as three distinct fields in each source record, the first two indicating internal nodes and the third indicating the branch or leaf node in the category hierarchy. Values from two or more fields in each source record may require merger into a single value for transformation. This can occur when a numeric value and an associated unit of measure are stored in two distinct fields in each source record but are stored in a single unit of measure field in each destination record. A direct, one-to-one mapping may not exist between the values within individual source and destination fields, and instead, there may be mapping between values or value combinations in one or more source fields and values or value combinations in one or more destination fields. In this situation, a direct, one-to-one mapping does not exist between the values within individual source and destination fields because a direct, one-to-one mapping does not exist between the source and destination fields themselves. For mappings to a unique field, or field combination, that uniquely identifies each destination record, the mapping tool matches the existing destination records that correspond to each source record based on the value of the unique field. During a record-at-a-time transform, the transform tool flags each source record that corresponds to an existing destination record for manual exception handling, and the user indicates that the transform record will typically either: (a) be skipped, (b) replace the existing record or (c) update the existing record. Moreover, there may be more than one unique field in the destination records, and more than one match between one but not all unique fields are also resolved.

The number of possible, reasonable mappings between a data source and a target schema can be enormous and users may be unable to conceive of all the possible alternatives and have difficulty specifying the correct mapping for a specific application. Database schema mappings, moreover, are typically complex queries and subtle changes to the mapping such as changing an inner join to an outer join may dramatically change the target data results. Often enough, the user performing the mapping may not fully understand the source data or schema fully, especially when dealing with legacy data sources. Even so, given the complexity of the mappings and the subtle differences between alternative mappings, even an expert user may require assistance. The ultimate goal of schema mapping is not to build the correct query, but to extract the correct data from the source to populate the target schema but most data transformation (ETL—Extract, Transform, and Load) tools and query formation tools focus on building queries or transformation programs but provide limited support in verifying that the derived data set is correct.

Systems currently exist which allow a user to map data from one schema to another often require the user to be familiar with both the source and target schema. A typical user interface of such a system, moreover, uses a visual depiction of the database structure but not of its data content.

What is needed is a tool for databases that facilitates the transformation of data from other databases. Once the connections between the database table receiving data and the database table providing data are established, the tool facilitates the transformation of data with minimal user review. It is essential that the data transformation proceed with all of the incoming data being placed in the proper fields of the receiving database automatically.

When a user attempts to map the source data fields to the target data fields he/she may be presented with a target field name that appears multiple times. As such, the user may be unable ascertain which target data field should be mapped to a particular source data field. Thus, mapping data from one database to another is a time-consuming process that requires a programmer to know the details of a source database and then write a program or algorithm that extracts the data and correctly inserts the data into a target database. The process is replete with opportunities for errors. First, the fields between any two unrelated databases rarely have the same names, by way of example only, in a source database one field may be labeled NAME and in the target database, the analogous field may be labeled EMPLOYEE. Often, the documentation of the source database may be lost because the data is very old and so it may not be possible to determine the name of the field upon inspection. In the current environment there are no means that integrate disparate data sources without significant manual effort. When no familiarity exists with the source data base there is no universal technology that automatically maps source data to a target database.

Thus, what is required is a dynamic and automated method and service that discovers the names of fields in a source database and then extracts the data from the fields and maps those fields to a target database. These needs and other that will become apparent are solved by the invention as stated below:

SUMMARY OF THE INVENTION

Thus, what is provided is a service, a computer-implemented method, and a computer program product having a plurality of computer-readable components that have computer program instructions that read seed or trace data inserted into an unknown source data schema, then discover the structure and organization of the source schema; and inspect the source data for one or more fields containing the trace data. The seed or trace data may have been entered into the source schema before the implementation of the method, or the method may provide a step for inserting the seed/trace data into the source schema. Discovering the structure and organization of the unknown source schema may entail reading a machine-readable catalog of the unknown source schema. The method, the service and the program product all are intended to comprise determining if one or more fields containing the trace data is pertinent to a target data schema. If so, program language commands may be generated by the dynamic data discovery to create a target data schema, or to create at least one new field in an existing target schema to which the source data in those pertinent fields may be mapped. Query language commands are also generated to load source data in the one or more pertinent fields of the source schema having the trace or seed data into the target data schema.

The source schema, the target schema, and the computer-implemented method, or service, or the computer program product may be executing on one or more data processing systems connected across a network, such as the Internet or a LAN or a WAN.

DETAILED DESCRIPTION OF THE INVENTION

The invention is described with reference to the accompanying drawings; however, the invention may be embodied in many different forms and should not be construed as limited to the embodiments set forth herein. Rather the illustrated embodiments are provided so that this disclosure is thorough and complete, and fully conveys the scope of the invention to those skilled in the art. Like numbers refer to like elements throughout.

As will be appreciated by one of skill in the art, the present invention may be embodied as a method, a data processing system, a computer program product and a service to dynamically discover data and the tables and fields of the data in a source data schema and then map the data to corresponding tables and fields in a target data schema. Accordingly, the present invention may take the form of an entirely hardware embodiment having a number of hardware components, an entirely software embodiment having a number of different software components, or an embodiment combining software and hardware components. Furthermore, the present invention may take the form of a computer program product on a computer-usable storage medium having computer-usable program components embodied in the medium. Any suitable computer readable medium may be utilized including hard disks, CD-ROMs, optical storage devices, magnetic storage devices, portable volatile or nonvolatile memory, or a transmission media such as those supporting the Internet or an intranet.

Components having computer program source code of the dynamic data discovery and mapper in accordance with a preferred mode described herein may be written in any programming language such as C, JAVA, SMALLTALK or C++. Object code of the dynamic data discovery and mapper components may execute entirely on an individual server or client, partly on an individual or a backup server or client, as a stand-alone software package, partly on the individual or backup server or client and partly on a remote server or client or entirely on the remote server or client. In the latter scenario, the remote server or client may be connected to the individual or backup server or client through a local area network (LAN) or a wide area network (WAN), or the connection may be made to the remote server or client via the Internet using an Internet Service Provider.

The dynamic data discovery and mapper is described below with reference to flowchart illustrations and/or block diagrams of methods, apparatus (systems), components, and computer program products according to embodiments of the invention. It will be understood that each block of the flowchart illustrations and/or block diagrams, and combinations of blocks in the flowchart illustrations and/or block diagrams, can be implemented by hardware components or software components having computer program instructions. These computer program instructions may be provided as one or more components to a processor of a general purpose computer, special purpose computer, or other programmable data processing apparatus to produce a machine, such that the components, which execute via the processor of the computer or other programmable data processing apparatus, implement the functions/acts specified in the flowchart and/or block diagram block or blocks.

These computer program components for the dynamic data discovery and mapper may also be stored in a computer-readable memory that can direct a computer or other programmable data processing apparatus to function in a particular manner, such that the components stored in the computer-readable memory produce an article of manufacture including components which implement the function/act specified in the flowchart and/or block diagram block or blocks. The computer program components may be loaded onto a computer or other programmable data processing apparatus to cause a series of operational steps to be performed on the computer or other programmable apparatus to produce a computer implemented process such that the components which execute on the computer or other programmable apparatus provide steps for implementing the functions/acts specified in the flowchart and/or block diagram block or blocks.

Figure 1:
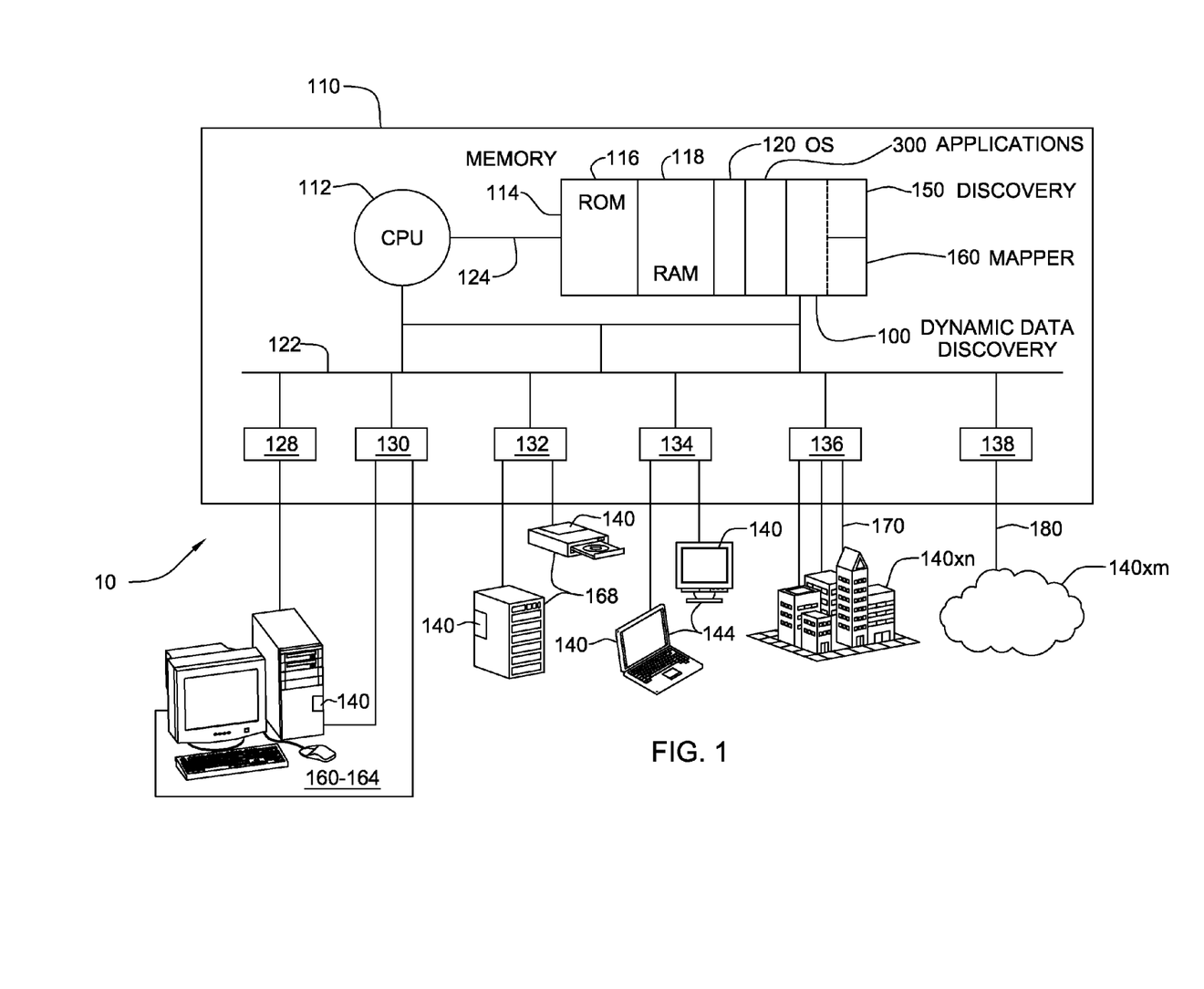
FIG. 1 is a simplified block diagram of a data processing network that can be used to access and store data in accordance with an embodiment of the invention.

Referring to FIG. 1, a high-level block diagram of a computer network system 10 consistent with an embodiment of the dynamic data discovery and mapper 100 is shown. Computer network system 10 preferably comprises a number of secure networked computers 110, each of which may have a central processing unit (CPU) 112, memory 114, and various digital and/or analog interfaces 128-138. The various devices communicate with each other via an internal communications bus 122. CPU 112 is a general-purpose programmable processor, executing instructions stored in memory 114; while a single CPU 112 is shown in FIG. 1, it should be understood that computer systems having multiple CPUs could be used. CPU 112 is capable of executing an operating system 120 and the dynamic data discovery and mapper 100 and other applications 300. CPU 112 is also capable of generating the components having computer program instructions embodying the dynamic data discovery and mapper 100 and is capable of receiving and transmitting the components embodying the dynamic data discovery and mapper 100. Communications bus 122 supports transfer of data, commands and other information between different devices, and while shown in simplified form as a single bus, it is typically structured as multiple buses including an internal bus 124 which may connect the CPU 112 directly with memory 114.

Memory 114 comprises a read only memory (ROM) 116 and a random-access memory (RAM) 128 for storing the operating system 120, the dynamic data discovery and mapper 100, and other applications 300, data and programs. Typically, those portions or programs, routines, modules of the operating system 120 necessary to "boot up" are stored in ROM 116. RAM 118 typically stores programs and data that will be erased when the computer turns off. Memory 114 is shown conceptually as a single monolithic entity but it is well known that memory is often arranged in a hierarchy of caches and other memory devices, some or all of which may be integrated into the same semiconductor substrate as the CPU 112. RAM 118 devices comprises the main storage of computer, as well as any supplemental levels of memory, e.g., cache memories, nonvolatile or backup memories, programmable or flash memories, other read-only memories, etc. In addition, memory 114 may be considered to include memory storage physically located elsewhere in computer, e.g., a cache memory in a processor or other storage capacity used as a virtual memory, e.g., as stored on a mass storage device 168 or on another computer coupled to computer via network. It is fully realizable that the dynamic data discovery and mapper 100 can be used to discover data in data schemas 140 within any memory 114 including ROM and RAM located within and outside the computer processing device 110 upon which the dynamic data discovery and mapper 100 is installed and executing. As shown in FIG. 1, dynamic data discovery and mapper 100 may be connected to data schema 140 stored on other devices across the network and may discover and map data to or from those data schema 140 in accordance with the principles herein; that is, data schema 140 represents either a source or a target data.

Operating system 120 and the dynamic data discovery and mapper 100 and other applications 300 reside in memory 114. Operating system 120 provides, inter alia, functions such as device interfaces, management of memory pages, management of multiple tasks, etc. as is known in the art. Examples of such operating systems may include LINUX, AIX, UNIX, Windows-based, Z/os, V/os, OS/400, an RTOS, a handheld operating system, etc. These operating systems 120 and other various of the dynamic data discovery and mapper 100 and other applications 300, other components, programs, objects, modules, etc. may also execute on one or more processors in another computer coupled to computer 110 via a network 170, 180, e.g., in a distributed or client-server computing environment, whereby the processing required to implement the functions of a computer program may be allocated to multiple computers 110 over a network 170, 180.

In general, the dynamic data discovery and mapper 100 executes within the CPU 112 to implement the embodiments of the invention, whether implemented as part of an operating system or a specific application, component, program, object, module or sequence of instructions may be referred to herein as computer programs or simply components. The dynamic data discovery and mapper 100 typically comprise one or more instructions that are resident at various times in various memory 114 and storage in a device and that, when read and executed by one or more processors in the processing device 110, cause that device 110 to perform the steps necessary to execute steps or elements embodying the various aspects of the invention. The dynamic data discovery and mapper 100 comprises at least a dynamic data discovery component 150 that discovers trace/seed data and the structure and organization of the source schema having the trace/seed data. The dynamic data discovery and mapper 100 further comprises a mapping component 160 that maps the discovered data and other source data to a target data schema in accordance with the features described herein.

It should be appreciated that computer 110 typically includes suitable analog and/or digital interfaces 128-138 between CPU 112 and the attached devices as is known in the art. For instance, computer 110 typically receives a number of inputs and outputs for communicating information externally. For interface with a software developer or operator, computer 110 typically includes one or more software developer input devices 160-164, e.g., a keyboard, a mouse, a trackball, a joystick, a touchpad, and/or a microphone, among others, and a display such as a CRT monitor, an LCD display panel, and/or a speaker, among others. It should be appreciated, however, that some implementations of computer 110, e.g., some server implementations, might not support direct software developer input and output. Terminal interface 134 may support the attachment of single or multiple terminals or laptop computers 144 and may be implemented as one or multiple electronic circuit cards or other units. Data storage 150 preferably comprises one or more rotating magnetic hard disk drive units, although other types of data storage, including a tape or optical driver, could be used. For additional storage, computer 110 may also include memory 114 comprising one or more mass storage devices 150, e.g., a floppy or other removable disk drive, a hard disk drive, a direct access storage device (DASD), an optical drive e.g., a compact disk (CD) drive, a digital video disk (DVD) drive, etc., and/or a tape drive, among others. The source or target database 140 or a portion of which may be discovered and/or mapped to by the dynamic data discovery and mapper 100 may be located on storage, including RAMs or mass storage devices of different computers 110 that are located through the Internet 180, a WAN 170, and other connected machines 128. One of skill in the art will further anticipate that the interfaces 128-238 may also be wireless.

Furthermore, computer 110 may include an interface 136, 138 with one or more networks 170, 180 to permit the communication of information with other processing devices and data schema 140 coupled to the network(s) 170, 180. Network interface(s) 136, 138 provides a physical and/or wireless connection for transmission of data to and from a network(s) 170, 180. Network(s) 170, 180 may be the Internet, as well as any smaller self-contained network such as an Intranet, a wide area network (WAN), a local area network (LAN), or other internal or external network using, e.g., telephone transmissions lines, satellites, fiber optics, T1 lines, wireless, public cable, etc. and any various available technologies. One of ordinary skill in the art understands that computer system 10 may be connected to more than one network 170, 180 simultaneously. Computer system and remote systems 128 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through network(s) 170, 180. Still yet, any of the components of the methods and program products shown in the embodiments of FIG. 1 through FIG. 4 could be deployed, managed, serviced by a service provider who offers to perform one or more of: discovering the fields within a source schema as by the a data discovery component 150, mapping the fields from the source schema to a target schema as by the mapping component 160 or other process steps that the dynamic data discovery and mapper 100 or its other components can perform.

In the context herein memory 114 having a source and/or a target schema 140 may also be considered nonvolatile or backup memories or a programmable or flash memories, read-only memories, etc., in a device physically located on a different computer, client, server, or other hardware memory device, such as a mass storage device or on another computer coupled to computer via network. Memory 114 may comprise remote archival memory such as one or more rotating magnetic hard disk drive units, a tape or optical driver having the source and/or target schema 140. Memory 114 may also be considered one or more mass storage devices, such as a floppy or other removable disk drive, a hard disk drive, a direct access storage device (DASD), an optical drive e.g., a compact disk (CD) drive, a digital video disk (DVD) drive, etc., and/or a tape drive, among others, each of which may have the source and/or target database 140.

Figure 2:
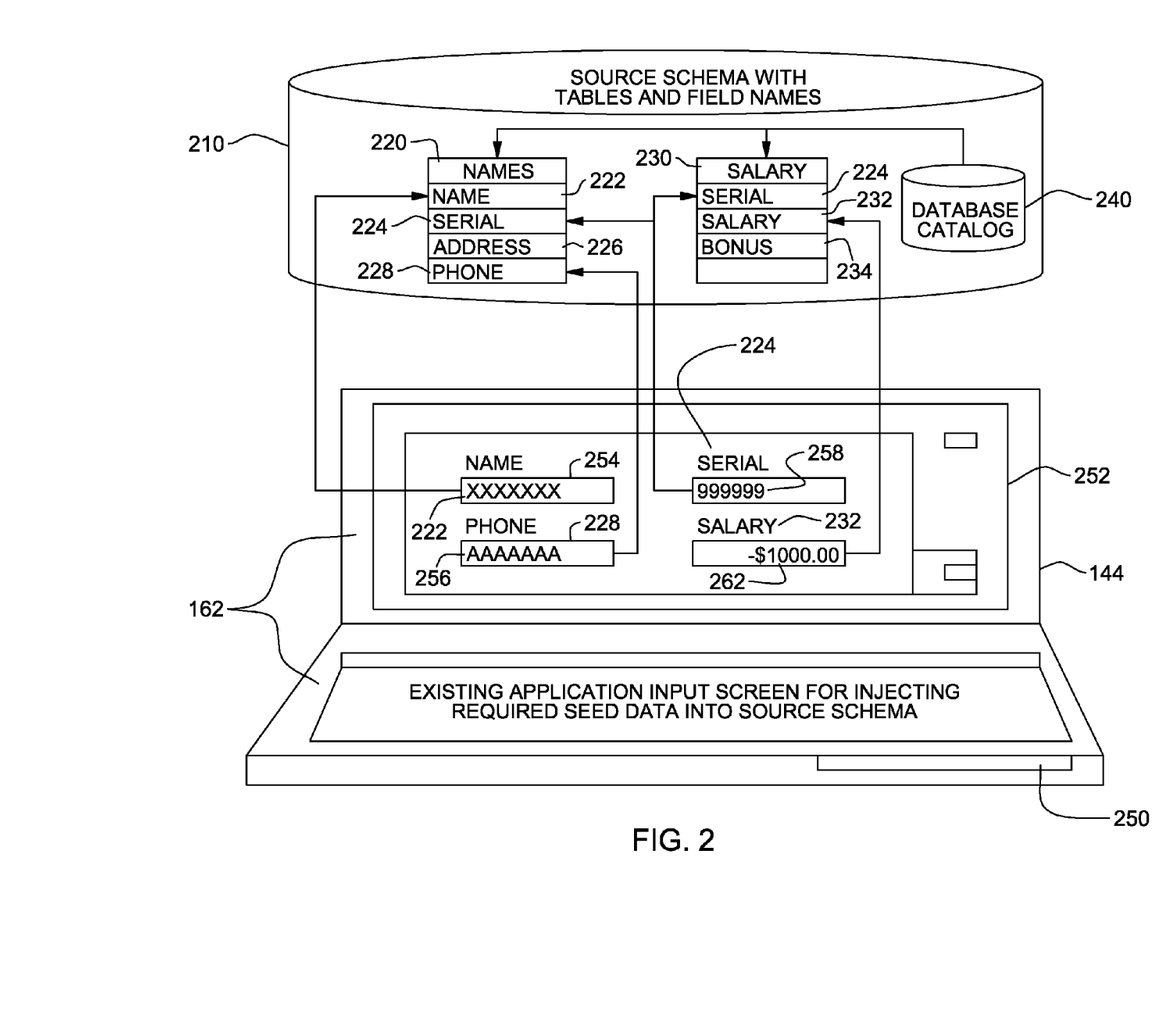
FIG. 2 is a simplified block diagram of information obtained from a source database.

With respect to FIG. 2, data in source schema 210 is shown having two tables: a Names table 220 and a Salary table 230. Within the Names tables 220, there are four fields: name 222, serial 224, address 226, and phone 228. Within the Salary table, there are three fields: serial 224, salary 232, and bonus 234. The source database has a catalog 240. Access is permitted to the source schema through an application 250, having an interface such as a graphical user interface 252 visible on an input device such as a laptop computer 144. Trace or seed data is entered into the source data schema, such as into certain fields that may be mapped to or created in a target schema; in this case the seed data XXXXXXX is entered into the name field 222 and the seed or trace data AAAAAAA is entered into the phone field 228 using the GUI 252 on laptop 144. The method, apparatus, service, and computer program product herein is applicable to any organization of data stored in a memory accessible by computer program instructions having a methodology or catalog to discover the structure and organization of the data; the steps and the computer program product and service described herein is not limited to databases in the strict definition of databases although the applicability to formal databases may be considered a preferred embodiment.

Using the source's data schema discoverable by the dynamic data discovery engine 100 reading the database catalog 240, the table names, field names and attribute layouts of the source schema can be discovered. Once these table names, field names and attribute layouts are discovered, the source's table names, field names, and contents can be extracted and processed to discover the source schema locations that contain the seed or trace data.

Figure 3:
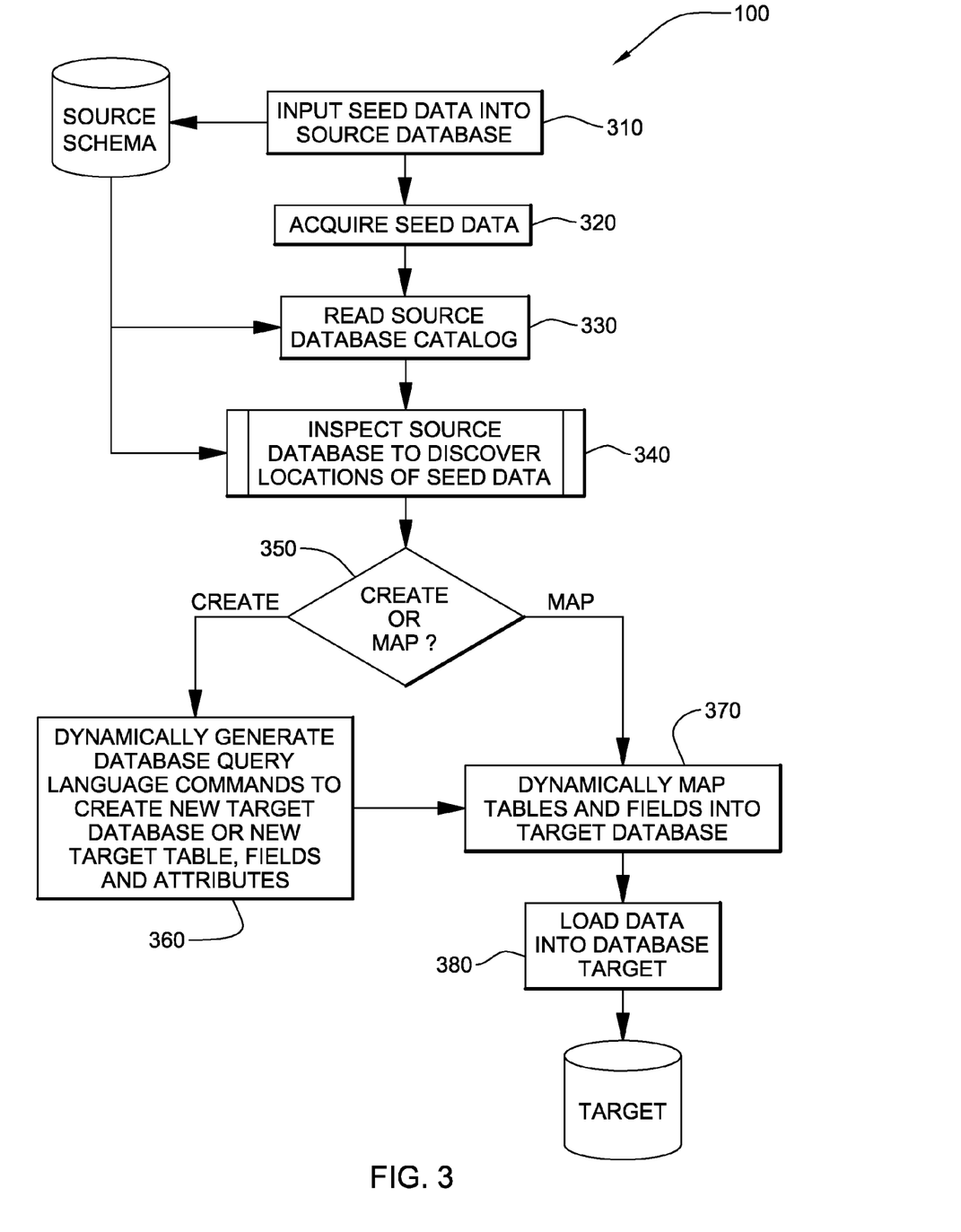
FIG. 3 is a simplified block diagram of an example of mapping data from a source database to a target base in accordance with features described herein. It is suggested that FIG. 3 be printed on the face of the patent.

FIG. 3 is a simplified flow chart of the method steps performed by the processes of the dynamic data discovery engine described herein. In step 310, a user will input seed trace data into the source's schema fields that may be required in the target data schema via an existing application input facility, such as shown in FIG. 2. In step 320, an seed acquisition component acquires the seed or trace data, using, e.g., an application program interface to interact with the source schema or by reading a flat file of the seed data, which may be acquired from the source schema or from a user. In step 330, a read component of the dynamic data discovery engine 100 reads the catalog of the source schema, and it is within this step that the dynamic data discovery engine 100 discovers the schema to the source's data, e.g., the source's table names, field names and attribute layout. In step 340, the discovery component of the dynamic data discovery engine inspects every field of every table to discover the seed/trace data within the source data. One of skill in the art will appreciate that the dynamic discovery engine 100 may be able to discriminate or limit which tables and which fields could be eliminated from the search. It is preferable, however, to be thorough and it is therefore recommended that the data discovery engine inspect each table and each field of the source data.

Once the seed data has been located within the source data, there is an opportunity afforded a user to inspect the tables and the fields and the attributes containing the seed data so that the user can determine which of the tables and fields are most relevant and contain the most significant information meaningful to the target data schema. In any event, the dynamic discovery engine now is faced with a choice at step 350 of whether to create a new target schema or to create new tables and new fields within an existing database or to dynamically map the tables and fields of the source database into an existing target schema. A new target data schema may be created or new tables and fields may be created in an existing target schema that may or may not be empty. If so, then the dynamic discovery engine 100 dynamically generates the database query language, such as SQL, or other language commands that automatically create the new tables and fields, characterizes the attributes, provides sufficient documentation, as well as create and/or update the database catalog of the target data schema in step 360. If the target data schema can accommodate the source data, its attributes and intended uses, the dynamic discovery engine 100 dynamically creates the commands from the database query language or other languages to dynamically map the tables and the fields into existing fields of the target database, as in step 370. A user may choose one of the paths, i.e., create or map, as a default path such that if a target data schema exists, a user may just drag and drop an icon of a discovered table or field from the source data schema onto an icon or other representation of the applicable table or field of the target data schema. Then, an application program interface and a meta-data layer of the dynamic data discovery engine translates the instructions to drag and drop or otherwise move and map the data into command language queries. The translation process may be hard-coded using (often procedural) transformation programs that do not focus on understanding the data source but allow users to refine their queries using data examples. In step 380, the actual transfer or copying of the source data from source schema into the target schema occurs.

Figure 4:
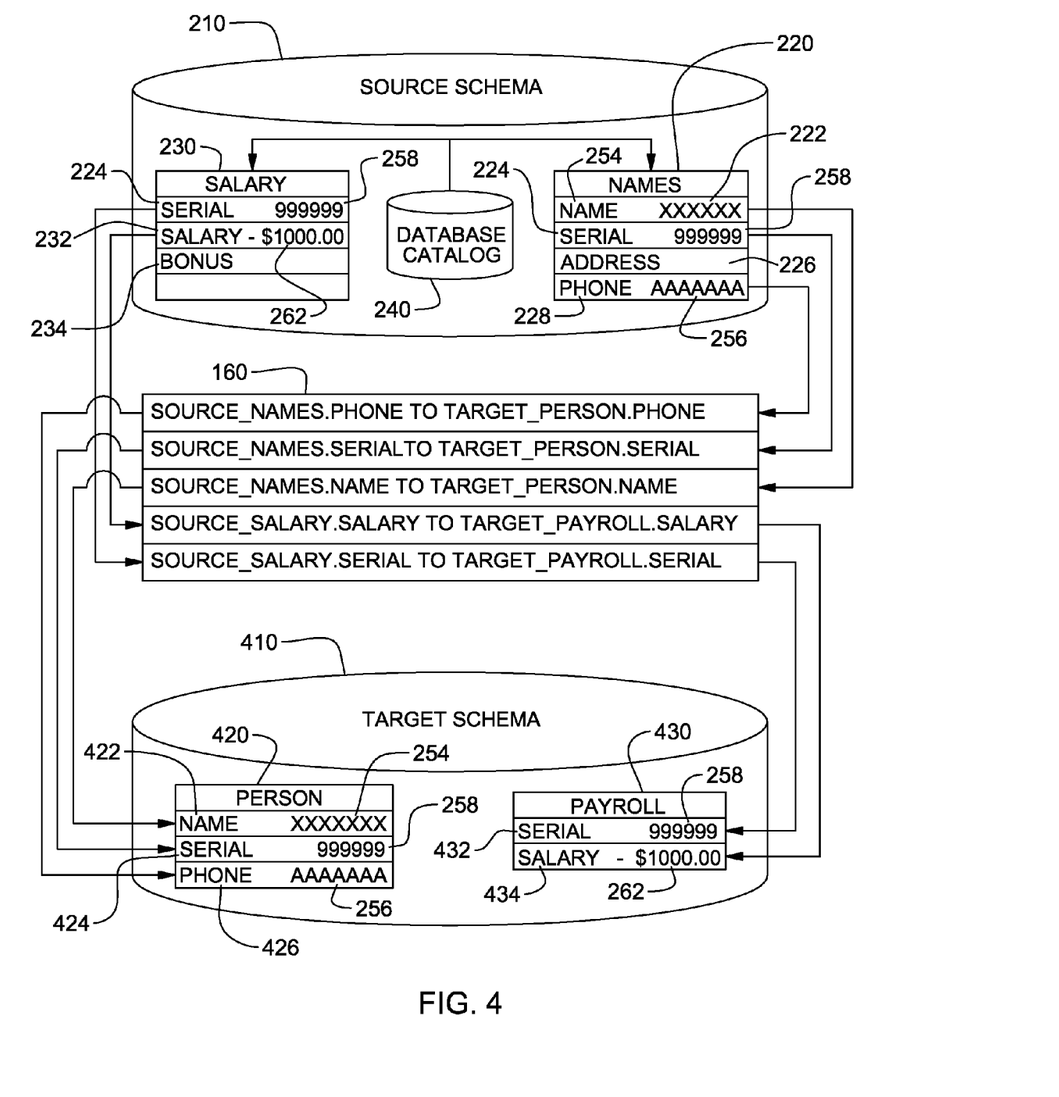
FIG. 4 is a simplified flow chart of how to discover and map data in a source database to meaningful data in a target database in accordance with features described herein.

FIG. 4 illustrates the result achieved by the dynamic data discovery engine and its components. By way of example only, fields within the Names table 220 of the source data schema 210 maps to other fields of a Persons table of the target data schema, specifically the Names field 222 of the Names table 220 of the source data schema 210 maps to the Name field 422 of the Person table 420 within the target data schema 410 with; Names.serial 220:224 maps to Person.serial 420:424; the Names.phone 220:228 maps to the Person- .phone 420:426; the Salary.serial 230:224 maps to Payroll.serial 430:432 and the Salary.salary 230:232 maps to Payroll.salary 430:434 of the target database 410.

As a result of the dynamic data discovery engine, there is no need for complex systems that consider, manage, and rank alternate mappings while allowing the final choice of mapping by a user who understands the semantics of the target schema. Another benefit is that complex query and constraint reasoning needed to understand subtleties while effectively communicating these subtleties to the user are avoided. Yet another advantage presented by the method and service herein, is that the user need not have to select a specific mapping, nor understand the mapping, nor understand how the specific mapping differs from other possible mappings. Previously, merging data between tables of databases may have required the use of complex, non-associative operators, the reasoning of which was often difficult for both users and query management tools. Because the operators may not be associative, even managing compositions of queries can be a difficult task. The dynamic data discovery and engine, as described herein, is scalable to large schemas, automatically creating the proper command language queries to permit users to incrementally create, evolve, and compose such complex queries. The method and components of the dynamic data discovery allow a user to map portions of the source data to the target without exposing the user to tangled query languages, such as Structured Query Language (SQL) or complex Query By Example (QBE) queries. The dynamic data discovery engine, its method and components herein further provide support to verify that the mapping is complete and correct so that the user need not have a thorough understanding of the data source and need not be required to debug complicated command language queries or procedural transformation programs by hand. A user is able to visualize not only the structure of a schema, but also transfer data from one schema to another without using data to guide the user. Ad hoc query tools provided by an expert data administrator having complete knowledge of the data and tightly integrated with a report generating facility are avoided. Using the dynamic data discovery engine, a user of the database is able to verify or rectify queries by working with the displayed data. The dynamic data discovery engine is particular useful for problem management, configuration management, asset management and change management environments wherein updates or knowledge from an old or different or a legacy database can be used with a new database engine, such as Oracle or JAVA. It is understood that the method, service, and program product herein need not be limited to databases but is limited only by the capability to read seed or trace data that were input to the source data schema and the additional capability to discover the structure and the organization of the source data. Once, the source schema is known and the data has been discovered, then a user can decide how to map it to the target schema, either by a default approach of drag and drop or by creation of a whole new target schema that may be a copy of the source data and its schema. It will be appreciated that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A computer-implemented method executing in one or more computers to discover source data, the method comprising:
   using a seed acquisition component executing in the one or more computers to acquire trace data that was input into the source data having a source schema unknown to a data discovery engine executing in the one or more computers;
   using a read component executing in the one or more computers to discover a structure and organization of the source schema;
   using a discovery component executing in the one or more computers to inspect the source data schema having the trace data for one or more fields relevant to a target data schema; and
   using a user interface to present the one or more fields relevant to the target data schema to a user for selection.

2. The method of claim 1, further comprising presenting a user interface by which a user may insert the trace data into the source data.

3. The method of claim 1 wherein the step of discovering the structure and organization of the unknown source schema further comprises the read component reading a machine-readable catalog of the unknown source schema.

4. The method of claim 1, further comprising the dynamic discovery engine generating program commands to create the target data schema.

5. The method of claim 1 further comprising the dynamic discovery engine generating program commands to create at least one new field in an existing target data schema.

6. The method of claim 1 further comprising a mapping component executing in the one or more computers mapping the source data to the target data schema.

7. The method of claim 6 further comprising generating program commands to load source data in the one or more selected fields of the source schema into the target data schema.

8. A method to map data from an unknown source schema to a target schema, comprising the steps of:
   accessing the unknown source schema stored in a memory of a data processing system using a user interface;
   a read component executing in one or more computer processors connected to the data processing system discovering the structure and organization of the unknown source schema within the data processing system;
   a discovery component executing in one or more computer processors inspecting a plurality of fields of the unknown source schema in the data processing system to discover trace data inserted into the unknown source schema;
   a data discovery engine executing on one or more computer processors presenting a user interface to a user to select which of the plurality of fields of the unknown source schema in the data processing system are relevant to the target schema;
   a mapping component executing on one or more computer processors mapping the selected plurality of fields of the source schema to the target schema;
   transferring source data in the plurality of relevant fields of the unknown source schema to respective fields in the target schema.

9. The method of claim 8 further comprising the data discovery engine executing an interface by which a user may insert trace data into the unknown source schema.

10. The method of claim 8 further comprising the data discovery engine generating commands to create the target schema.

11. The method of claim 8 further comprising the data discovery engine moving the source data into existing fields of an existing target schema.

12. The method of claim 8 wherein the target schema is located on a second data processing system other than the data processing system having the source data.

13. The method of claim 8 wherein a computer-implemented method to map data from an unknown source schema to a target schema is located on a third data processing system other than a second data processing system having the target schema and other than a first data processing system having the unknown source data.

14. A computer program product comprising a computer-storage medium for mapping source data to a target schema, the computer program product comprising:

computer usable program code of an interface component by which a user inserts trace data into the source data;

computer usable program code of a reading component that reads a structure and an organization of an unknown source schema of the source data;

computer usable program code of a seed acquisition component that discovers the trace data inserted into the unknown source schema;

computer usable program code of a inspection component that inspects having the trace data of one or more fields of the source schema and determines if the one or more fields contain data other than trace data to be mapped to a target schema; and computer usable program code of a mapping component that maps the source data in the one or more fields having the trace data to the target schema.

15. The computer program product of claim 14 wherein the reading component reads a machine-readable catalog of a source database.

16. The computer program product of claim 14 further comprising computer usable program code of a command generation component.

17. The computer program product of claim 16 wherein the command generation component generates program commands to create a new target schema.

18. The computer program product of claim 16 wherein the command generation component generates program commands to load the source data in the one or more fields to the target schema.

* * * * *